(12) United States Patent
Suzuki

(10) Patent No.: US 7,472,996 B2
(45) Date of Patent: Jan. 6, 2009

(54) PROJECTOR HAVING FIRST AND SECOND VENTILATION OPENINGS AND FIRST AND SECOND BARRIER MEMBERS

(75) Inventor: Masakazu Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 34 days.

(21) Appl. No.: 11/697,131

(22) Filed: Apr. 5, 2007

(65) Prior Publication Data

US 2007/0236945 A1 Oct. 11, 2007

(30) Foreign Application Priority Data

Apr. 6, 2006 (JP) ............... 2006-104760

(51) Int. Cl.
| | |
|---|---|
| G03B 21/16 | (2006.01) |
| G03B 21/18 | (2006.01) |
| G03B 21/14 | (2006.01) |
| G03B 21/22 | (2006.01) |
| F21V 29/00 | (2006.01) |

(52) U.S. Cl. .................... 353/60; 353/61; 353/119; 362/294

(58) Field of Classification Search .......... 353/52, 353/57, 60, 61, 119; 352/146; 362/294
See application file for complete search history.

(56) References Cited

U.S. PATENT DOCUMENTS 5,860,719 A * 1/1999 Suzuki et al. .............. 353/61

2001/0021006 A1 9/2001 Shimizu ................ 353/57
2004/0263799 A1 12/2004 Lim ..................... 353/61
2006/0170876 A1 * 8/2006 Takemi et al. ............ 353/61

FOREIGN PATENT DOCUMENTS

| JP | 08-314011 | 11/1996 |
|---|---|---|
| JP | 11-237691 A | 8/1999 |
| JP | 2001-290219 | 10/2001 |
| JP | 2002-216536 A | 8/2002 |
| JP | 2004-239975 | 8/2004 |

* cited by examiner

*Primary Examiner*—Melissa J Koval
(74) *Attorney, Agent, or Firm*—Global IP Counselors, LLP

(57) ABSTRACT

A projector includes a case, a lamp unit and a barrier mechanism. The case has a first ventilation opening for communicating an inner side with an outer side of the case. The lamp unit is disposed in the case. The lamp unit includes a housing and a lamp body disposed in the housing. The housing has a second ventilation opening for communicating an inner side with an outer side of the housing. The barrier mechanism is disposed on a path from the second ventilation opening to the first ventilation opening. The barrier mechanism includes a first barrier member and a second barrier member. The first barrier member has a first receiving plate facing the second ventilation opening. The second barrier member has a second receiving plate disposed apart from the first receiving plate in a first direction to the second ventilation opening and disposed offset from the first receiving plate in a second direction crossing the first direction.

9 Claims, 5 Drawing Sheets

PROJECTOR HAVING FIRST AND SECOND VENTILATION OPENINGS AND FIRST AND SECOND BARRIER MEMBERS

CROSS-REFERENCE TO RELATED APPLICATIONS

This application claims priority to Japanese Patent Application No. 2006-104760 filed on Apr. 6, 2006. The entire disclosure of Japanese Patent Application No. 2006-104760 is hereby incorporated herein by reference.

BACKGROUND OF THE INVENTION

1. Field of the Invention

The present invention generally relates to a projector. More specifically, the present invention relates to a projector equipped with a lamp unit.

2. Background Information

A conventional projector includes a case and a lamp unit disposed in the case. The lamp unit includes a housing, a bulb and a reflector. The bulb and the reflector are disposed in the housing. The bulb is filled with a gas and serves as a light source. The reflector reflects the light of the bulb and enhances its directionality.

On the case and the housing of the lamp unit, ventilation openings are provided respectively to allow air generated by a fan to pass from inside to outside of the case or the lamp unit. With the projector, a flow of air must be set high in order to prevent heat generated by the lamp unit from affecting the lamp unit itself, various mechanisms, and so forth. Thus, the ventilation openings of the case and the lamp unit must have a large opening area.

If the bulb or the reflector of the lamp unit should be damaged for some reason, relatively large fragments of the bulb or the reflector that scatter around an area are prevented from flying to the outside by a mesh, a louver, or the like that is generally installed at the ventilation opening of the case. Nevertheless, fragments that are not large enough to be blocked by the mesh or the louver can still pass through the ventilation opening of the case and fly outside. Therefore, there is a risk of the fragments hitting a person near the projector, and it is conceivable that a person could even be injured by such fragments.

In view of the above, it will be apparent to those skilled in the art from this disclosure that there exists a need for an improved projector. This invention addresses this need in the art as well as other needs, which will become apparent to those skilled in the art from this disclosure.

SUMMARY OF THE INVENTION

It is an object of the present invention to provide a projector which prevents fragments from a lamp unit breaking from flying out of a ventilation opening of a case holding the lamp unit.

In accordance with one aspect of the present invention, a projector includes a case, a lamp unit and a barrier mechanism. The case has a first ventilation opening for communicating an inner side with an outer side of the case. The lamp unit is disposed in the case. The lamp unit includes a housing and a lamp body disposed in the housing. The housing has a second ventilation opening for communicating an inner side with an outer side of the housing. The barrier mechanism is disposed on a path from the second ventilation opening to the first ventilation opening. The barrier mechanism includes a first barrier member and a second barrier member. The first barrier member has a first receiving plate facing the second ventilation opening. The second barrier member has a second receiving plate disposed apart from the first receiving plate in a first direction to the second ventilation opening and disposed offset from the first receiving plate in a second direction crossing the first direction.

With the present invention, even if some fragments are scattered by damage to the lamp unit and fly out through the second ventilation opening, the fragments are blocked by the barrier mechanism. Specifically, the fragments are repelled and decelerated by the first receiving plate or second receiving plate. Thus, the fragments fall inside the case. Therefore, a situation is prevented in which fragments fly out of the first ventilation opening of the case and pose a danger to a nearby person.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Referring to FIGS. 1 to 5, a projector A includes a case 1, a lamp unit 2, a cover member 3 and a barrier mechanism 5. The projector A is placed on a floor or a table or suspended from the ceiling.

Figure 1:
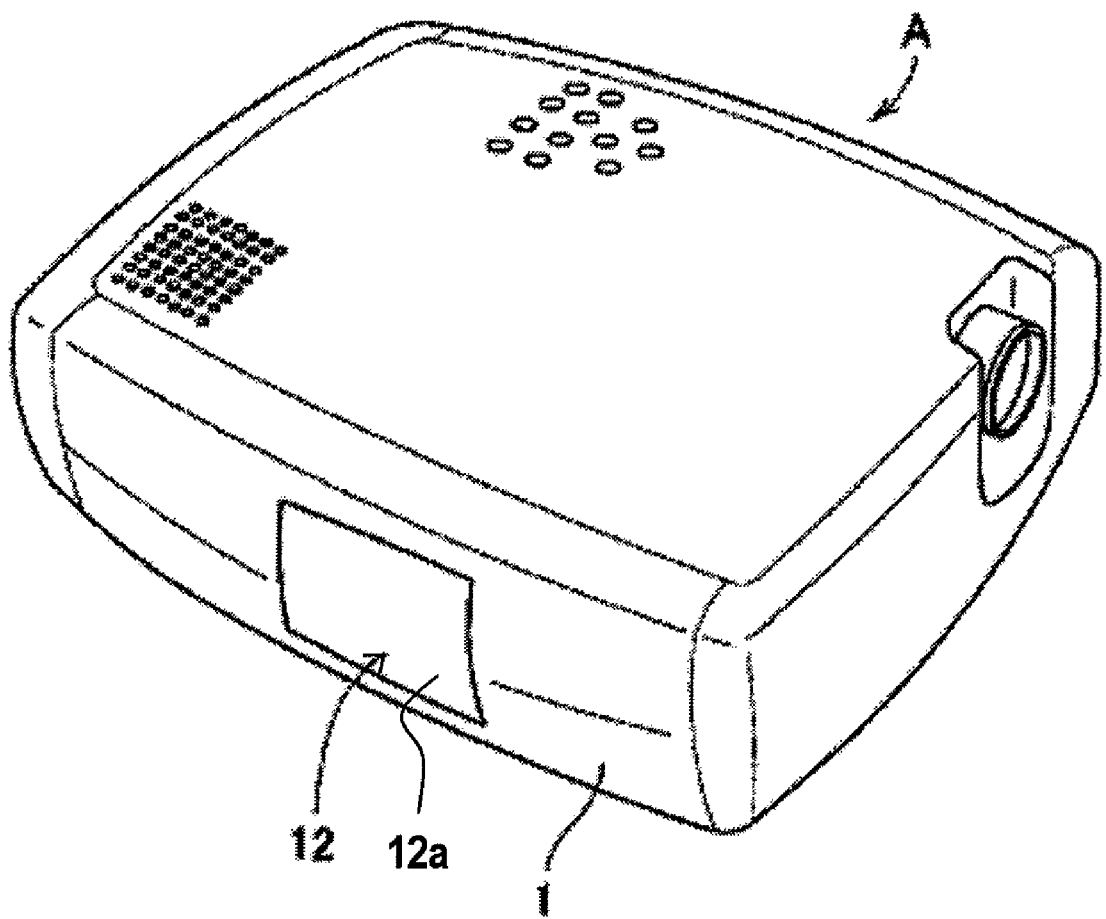
FIG. 1 is a simplified external view of a projector pertaining to the present invention.
Figure 2:
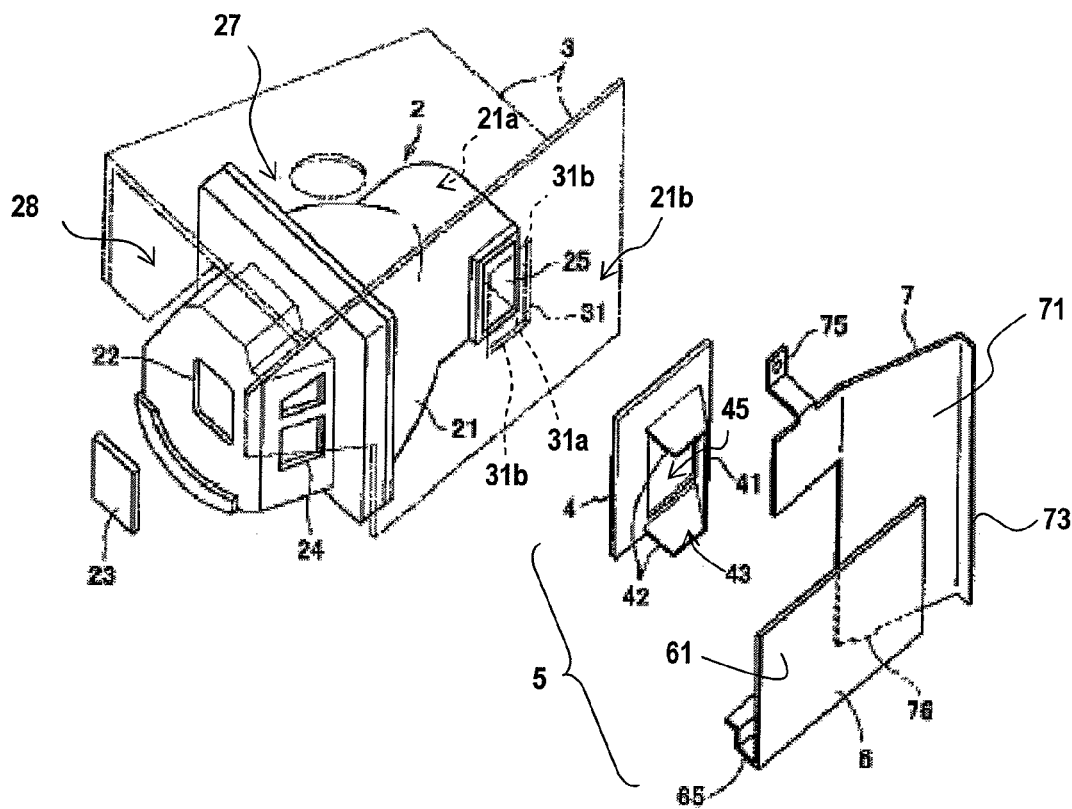
FIG. 2 is a simplified exploded oblique view of a lamp unit and a barrier mechanism.
Figure 3:
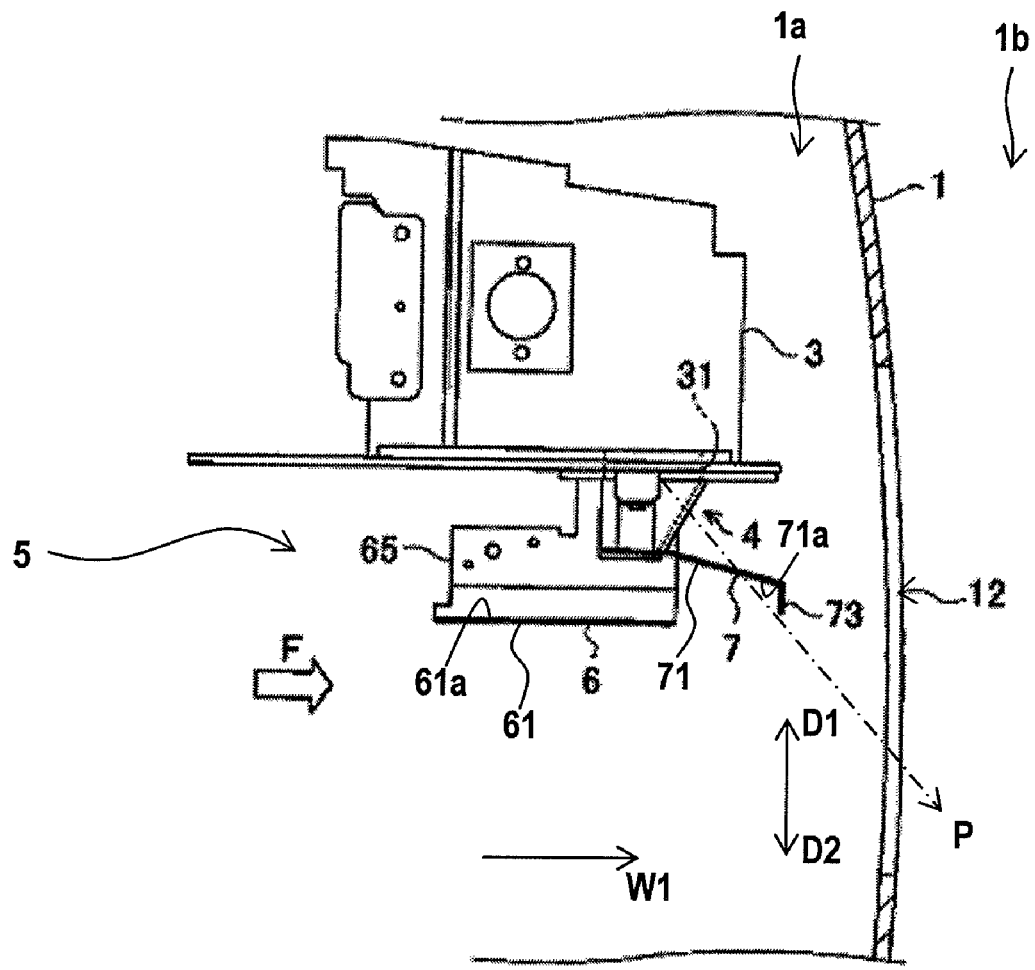
FIG. 3 is a simplified plan view of the main parts of a projector pertaining to the present invention.

As shown in FIGS. 1 to 3, the case 1 includes a low-profile box and is equipped with a first ventilation opening 12 for communicating an inside (or inner side) 1a with an outside (or outer side) 1b of the case 1. The first ventilation opening 12 has a relatively large opening area to allow cooling air generated by a fan (not shown) to pass from the inside 1a to the outside 1b of the case 1. The first ventilation opening 12 is hidden behind a cover member 12a, such as a mesh or louvers, that is designed not to drastically impair ventilation.

The lamp unit 2 is mounted to an optical casing (not shown) which is provided on the inside 1a of the case 1. Specifically, the lamp unit 2 is attached to the optical casing by being screwed to the optical casing. The lamp unit 2 has a housing 21, a bulb (or lamp body) 27 and a reflector 28. The housing 21 is attached to the optical casing by being screwed to the optical casing. On the housing 21, a window 22, a front ventilation opening 24 and a second ventilation opening 25 is formed. The window 22 is formed on a front side of the housing 21 and is covered with a transparent glass 23. The front ventilation opening 24 is formed on the front side of the housing 21. The front ventilation opening 24 functions mainly as a cooling air intake port. The second ventilation opening 25 is formed on a rear side of the housing 21 in a substantially rectangular shape and communicates an inside (or inner side) 21a with an outside (or outer side) 21b of the housing 21. The second ventilation opening 25 functions mainly as a cooling air outlet.

The bulb 27 and the reflector 28 are disposed in the housing 21. The bulb 27 is filled with a gas and serves as a light source. The reflector 28 is configured to reflect the light of the bulb 27 and enhance its directionality. Light generated by the bulb 27 and reflected by the reflector 28 exits the window 22 and undergoes optical processing.

The cover member 3 covers the lamp unit 2 from top and both lateral sides. The cover member 3 is screwed to a chassis (not shown) provided on the inside 1a of the case 1. On the cover member 3, a substantially rectangular third ventilation opening 31 is formed. The third ventilation opening 31 is formed corresponding to the second ventilation opening 25 and communicates with the second ventilation opening 25.

The barrier mechanism 5 is disposed between the second ventilation opening 25 and the first ventilation opening 12 (see FIG. 3). Specifically, the barrier mechanism 5 is configured to block a direct path (or path) P from the second ventilation opening 25 to the first ventilation opening 12. The barrier mechanism 5 prevents fragments from scattering and flying out of the first ventilation opening 12 after the bulb 27, the reflector 28 or other such elements that make up the lamp unit 2 is damaged. The barrier mechanism 5 includes a blocking frame 4, a first barrier member 6 and a second barrier member 7.

As shown in FIG. 2, the blocking frame (or third barrier member) 4 has a side plate (or first blocking plate) 41 attached along a side edge of an opening 45 and upper and lower plates (or second blocking plates) 42 attached above and below the side plate 41. The side plate 41 and the upper and lower plates 42 are provided in an open box shape and form an enclosure 43. The blocking frame 4 is attached to the cover member 3 so that the opening 45 is substantially aligned to the third ventilation opening 31. Thereby, the side plate 41 is configured to extend from the side edge 31a of the third ventilation opening 31 and the upper and lower plates 42 are configured to extend from the upper and lower edges 31b respectively. Moreover, the enclosure 43 communicates with the opening 45 and the third ventilation opening 31. The enclosure 43 sticks out from the third ventilation opening 31.

Figure 4:
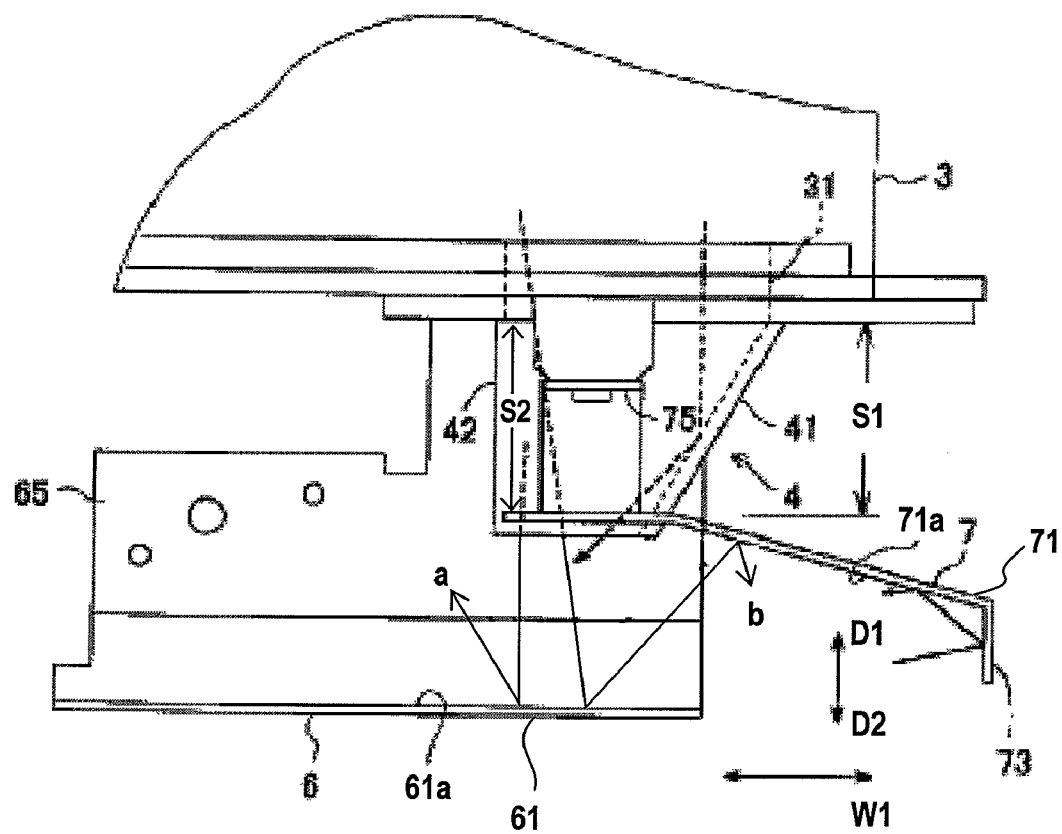
FIG. 4 is a detail view of a portion of FIG. 3.
Figure 5:
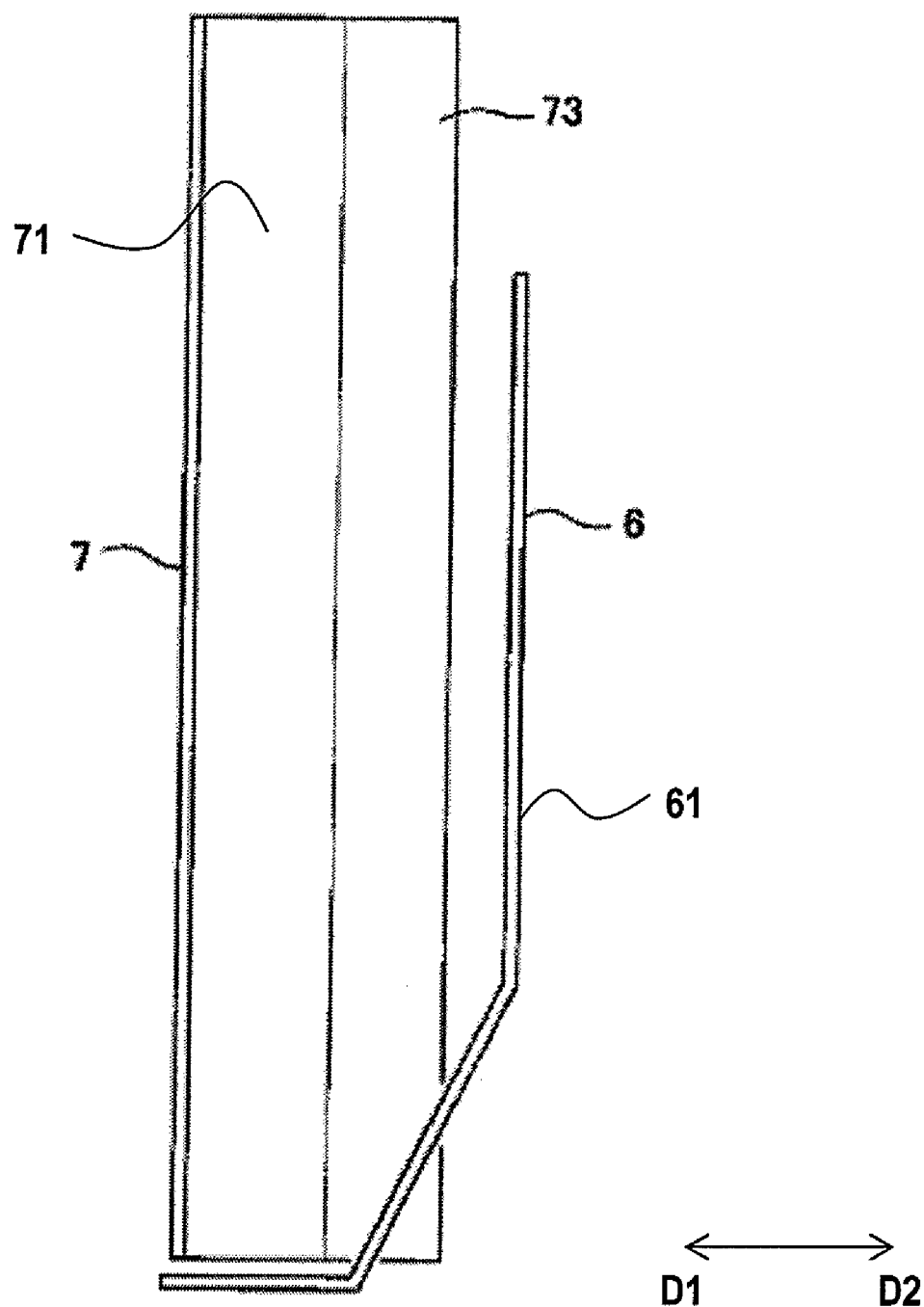
FIG. 5 is a detail view of the positional relationship between a first barrier member and a second barrier member.

The first barrier member 6 and the second barrier member 7 are substantially rectangular in shape and are made of sheet metal, for example. The first barrier member 6 includes a first receiving plate 61 and an attachment tab 65. The first receiving plate 61 is disposed vertically and across from the enclosure 43 and from the second and third ventilation openings 25 and 31. Referring to FIG. 4, a surface 61a of the first receiving plate 61 is configured to face the second ventilation opening. Furthermore, the first receiving plate 61 is configured to block any fragments that fly through the second and third ventilation openings 25 and 31. The attachment tab 65 is disposed at a bottom of the first receiving plate 61. The first barrier member 6 is attached to a chassis (not shown) of the case 1 by screwing the attachment tab 65 to the chassis.

As shown in FIGS. 2 to 5, the second barrier member 7 is disposed apart from the first barrier member 6 in a first direction D1, which is perpendicular to the first receiving plate 61 and substantially parallel to a direction from the first receiving plate 61 to the second ventilation opening 25. In other words, the second barrier member 7 is disposed across from the first barrier member 6 by a gap. Furthermore, the second barrier member 7 and the first barrier member 6 offset in a planar direction (or second direction) W1 which crosses the first direction D1. More preferably, the planar direction W1 is substantially perpendicular to the first direction D1.

The second barrier member 7 includes a second receiving plate 71, a blocking tab 73 and attachment tabs 75 and 76. The second receiving plate 71 is disposed vertically and across from the enclosure 43 and from the second and third ventilation openings 25 and 31. More specifically, the second receiving plate 71 is disposed apart from the first receiving plate 61 in the first direction D1 toward the second ventilation opening 25. Thus, a surface 71a of the second receiving plate 71 is disposed at a position separated from the first receiving plate 61 by a gap and faces the first receiving plate 61. In addition, the second receiving plate 71 and the first receiving plate 61 offset in the planar direction W1. In other words, the second receiving plate 71 is disposed offset from the first receiving plate 61 toward the first ventilation opening 12. Furthermore, the second receiving plate 71 is configured to block any fragments repelled by the first receiving plate 61 of the first barrier member 6.

The blocking tab 73 is formed by bending an outer end of the second receiving plate 71. The blocking tab 73 protrudes in a direction D2, which is opposite the first direction D1, toward the first barrier member 6. The attachment tabs 75 and 76 are respectively provided at top and bottom portions of the second receiving plate 71. The second barrier member 7 is attached to the cover member 3 by screwing the attachment tabs 75 and 76 to the cover member 3.

As shown in FIG. 4, the side plate 41 of the blocking frame 4 extends from an edge of the third ventilation opening 31 of the cover member 3 toward the first receiving plate 61 beyond the second barrier member 7. Thus, the side plate 41 blocks a gap space S1 between the cover member 3 and the second barrier member 7 that opens in the planar direction W1. Therefore, even if fragments pass through the third ventilation opening 31, the side plate 41 prevents the fragments from flying out of the first ventilation opening 12 through the gap space S1 formed between the cover member 3 and the second barrier member 7. Furthermore, the upper and lower plates 42 are provided contiguously with the side plate 41 and block gap spaces S2 located above and below the third ventilation opening 31 that open in a direction perpendicular to the planar direction W1.

As shown in FIG. 3, the planar direction W1 is substantially parallel to an orientation F of the cooling air at a place around the first receiving plate 61 in the inside 1a of the case 1 corresponding to the outside 21b of the housing 21. Accordingly, the cooling air passes without much resistance between the first barrier member 6 and the second barrier member 7. Therefore, its cooling action is not impaired.

If the bulb 27, the reflector 28 or other parts of the lamp unit 2 is damaged, some of the fragments will hit an inner face of the housing 21 of the lamp unit 2 and fall inside the housing 21. The rest of the fragments will pass through the second ventilation opening 25 and the third ventilation opening 31. However, with the projector A of the present invention, the fragments passed through the second and third ventilation openings 25 and 31 hit the first receiving plate 61 of the first barrier member 6. Then, the fragments are repelled and decelerated by the first receiving plate 61, as shown by arrow a in FIG. 4, and fall inside the case 1. Even if some fragments have not fallen inside the case 1 after being repelled by the first receiving plate 61, these fragments are received and decelerated by the second receiving plate 71, as shown by arrow b in FIG. 4, or by the blocking tab 73, and fall inside the case 1.

Since any fragments that have not fallen inside the case 1 despite being repelled and decelerated by the first receiving plate 61 are repelled and further decelerated by the second stage receiving plate 71, almost all of the fragments fall and remain inside the case 1. This prevents fragments from flying out of the first ventilation opening 12 to the outside 1b. It was found that the fragments remaining in the case 1 include nearly all fragments that are at least 0.8 mm in size and are small enough to pass through the first ventilation opening 12. Furthermore, a situation is prevented in which the fragments fly out of the first ventilation opening 12 and pose a danger to a nearby person. Accordingly, it is possible to increase the safety of a user when the projector is used. Also, since the barrier mechanism 5 is formed without moving parts, complexity in the assembly process is avoided.

Also, with this embodiment, as shown in FIG. 4, since the side plate 41 of the blocking frame 4 blocks the gap space S1 that opens in the planar direction W1 between the cover member 3 and the second barrier member 7, a situation in which fragments pass through the gap space S1 and fly out of the first ventilation opening 12 of the case 1 to the outside 1b is effectively prevented. Furthermore, since the upper and lower plates 42 are provided contiguously with the side plate 41, fragments are prevented from scattering upward or downward even if a ventilation opening or other opening is provided to the upper or lower wall of the case 1. Thus, a situation in which fragments fly out of the ventilation opening or other opening to the outside 1b of the case 1 is effectively prevented.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a projector equipped with the present invention. Accordingly, these terms, as utilized to describe the present invention should be interpreted relative to a projector equipped with the present invention as used in a normal position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A projector comprising:
    a case having a first ventilation opening for communicating an inner side with an outer side of the case;
    a lamp unit disposed in the case, the lamp unit including a housing and a lamp body disposed in the housing, the housing having a second ventilation opening for communicating an inner side with an outer side of the housing; and
    a barrier mechanism disposed on a path from the second ventilation opening to the first ventilation opening, the barrier mechanism including a first barrier member and a second barrier member,
    the first barrier member having a first receiving plate facing the second ventilation opening,
    the second barrier member having a second receiving plate disposed apart from the first receiving plate in a first direction towards the second ventilation opening with respect to the first receiving plate and disposed offset from the first receiving plate in a second direction from the first receiving plate toward the first ventilation opening.

2. The projector according to claim 1, wherein
    the first receiving plate is configured to repel and decelerate a fragment resulting from a damage to the lamp unit and flying out through the second ventilation opening, and
    the second receiving plate is configured to receive and decelerate the fragment repelled by the first receiving plate.

3. The projector according to claim 2, wherein
    the lamp unit further includes a reflector for reflecting light of the lamp body.

4. A projector comprising:
    a case having a first ventilation opening for communicating an inner side with an outer side of the case;
    a lamp unit disposed in the case, the lamp unit including a housing and a lamp body disposed in the housing, the housing having a second ventilation opening for communicating an inner side with an outer side of the housing; and
    a barrier mechanism disposed on a path from the second ventilation opening to the first ventilation opening, the barrier mechanism including a first barrier member and a second barrier member,
    the first barrier member having a first receiving plate facing the second ventilation opening,
    the second barrier member having a second receiving plate disposed apart from the first receiving plate in a first direction to the second ventilation opening and disposed offset from the first receiving plate in a second direction crossing the first direction,
    the second barrier member being equipped with a blocking tab that protrudes from the second receiving plate in a direction opposite the first direction.

5. The projector according to claim 4 further comprising
    a cover member configured to cover the lamp unit, the cover member having a third ventilation opening for communicating with the second ventilation opening of the housing.

6. The projector according to claim 5, wherein
    the barrier mechanism further includes a third barrier member mounted to the cover member, the third barrier member having a first blocking plate that extends from an edge of the third ventilation opening toward the first receiving plate and blocks a gap space that opens in the second direction between the cover member and the second barrier member.

7. The projector according to claim 6, wherein
the third barrier member further having a second blocking plate that extends from the edge of the third ventilation opening toward the first receiving plate and blocks a gap space that opens in a direction perpendicular to the second direction between the cover member and the second barrier member.

8. The projector according to claim 7, wherein
the second direction is substantially parallel to an orientation of air at a place in the inner side of the case corresponding to the outer side of the housing.

9. The projector according to claim 8, wherein
the second direction is substantially parallel to the orientation of air at a place around the first receiving plate.

* * * * *